Sept. 26, 1967   J. W. FELLOWS   3,343,616
CONTROL PROVISION FOR WEIGHING SYSTEMS
Filed Nov. 26, 1965   4 Sheets-Sheet 1

INVENTOR
JAMES W. FELLOWS
BY
George A. Woodruff
ATTORNEY

Sept. 26, 1967　　　　J. W. FELLOWS　　　　3,343,616
CONTROL PROVISION FOR WEIGHING SYSTEMS
Filed Nov. 26, 1965　　　　　　　　　　4 Sheets-Sheet 2
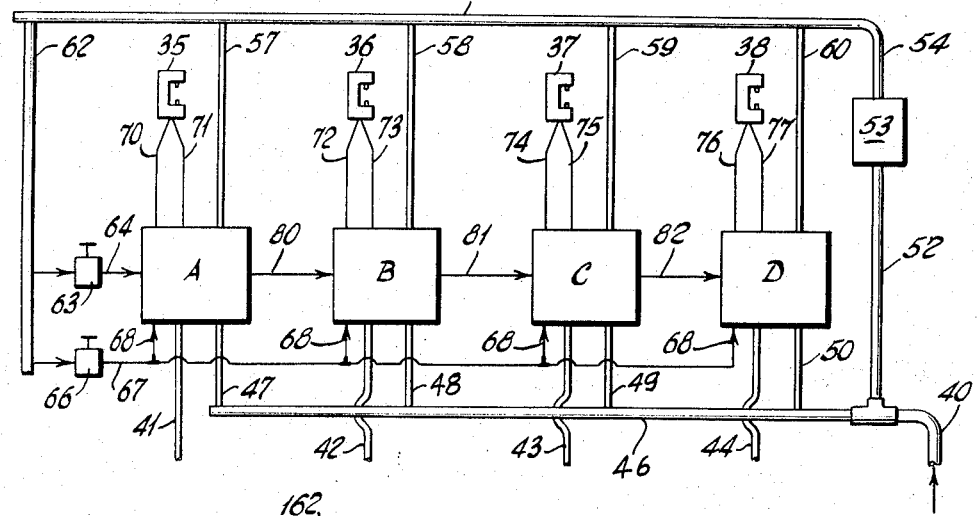
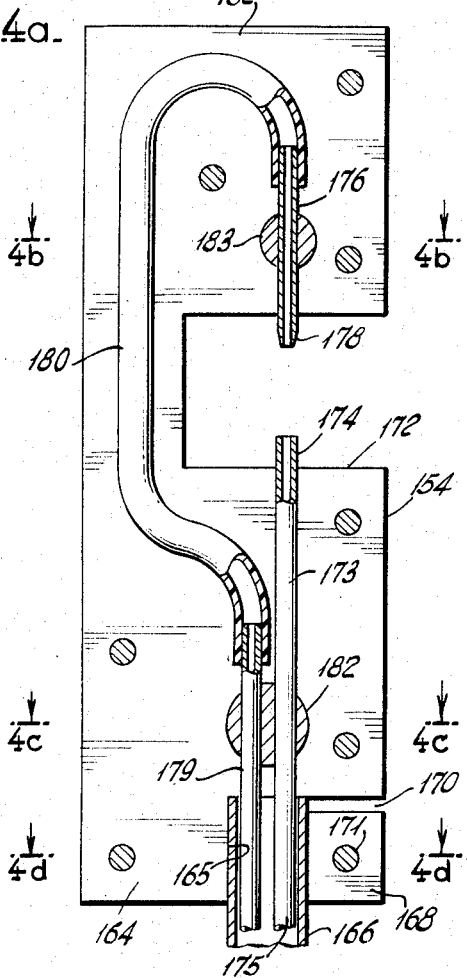
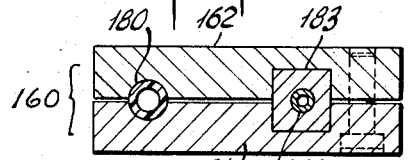
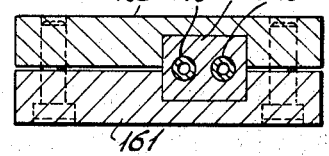
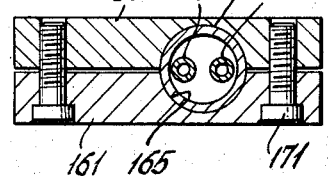
INVENTOR
JAMES W. FELLOWS
BY
George A. Woodruff
ATTORNEY

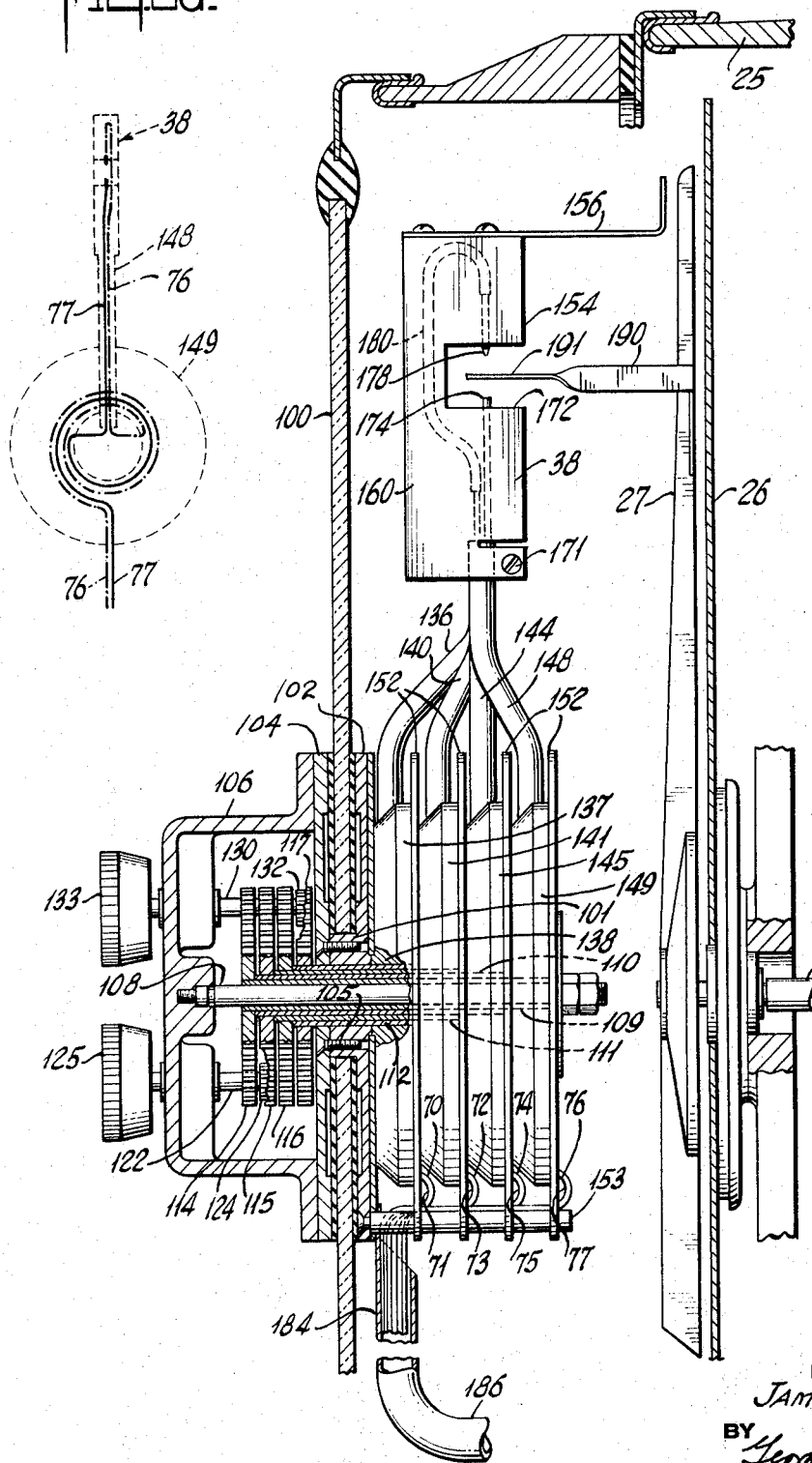

Sept. 26, 1967           J. W. FELLOWS           3,343,616

CONTROL PROVISION FOR WEIGHING SYSTEMS

Filed Nov. 26, 1965           4 Sheets-Sheet 4

Fig.5.

INVENTOR
JAMES W. FELLOWS
BY George G. Woodruff
ATTORNEY

United States Patent Office 3,343,616
Patented Sept. 26, 1967

3,343,616
CONTROL PROVISION FOR WEIGHING SYSTEMS
James W. Fellows, St. Johnsbury, Vt., assignor to Fairbanks Morse Inc., New York, N.Y., a corporation of Delaware
Filed Nov. 26, 1965, Ser. No. 509,929
10 Claims. (Cl. 177—70)

This invention relates to weighing systems, and more particularly to improved control provisions especially suitable for, but not limited to, weighing systems provided for bulk weighing and material batching.

The present invention is directed to the utilization of weight sensing interruptable air jet devices and fluid flow relays devoid of moving parts, arranged in cooperative relationship forming an improved control system applicable to bulk and batch weighing operations, and which avoids inherent disadvantages found in heretofore known systems employing mechanical, electrical, or conventional pneumatic valve controls. Accordingly:

An object of the invention is to provide an improved air operated control arrangement for weighing apparatus, characterized by relatively simple and small size parts readily capable of compact assembly, high speed and fidelity of operating response, and a low rate of air consumption, and which is entirely explosion-proof.

Another object is to provide in weighing apparatus having a weight indicating dial and pointer, an improved control arrangement providing one or more weight sensing elements positionable selectively relative to the dial and each having spaced apart air transmitter and receiver nozzles, wherein low pressure air delivered to the transmitter nozzle normally establishes an air stream into the receiver nozzle, an interceptor element on the dial pointer for intercepting the air stream when the pointer approaches the sensing element, and a switching circuit under control of the sensing elements for controlling operation of a desired device or mechanism to be controlled as, for example, one or more material feed control gates.

Another object is to provide an improved control arrangement of the character stated in the foregoing object, wherein the switching circuit embodies low pressure fluid (air) relays devoid of mechanical moving parts, referred to in the art as turbulence amplifiers. In a simple form thereof which is preferred and herein utilized, the relay comprises a chamber having aligned, spaced apart supply input and collector tubes, one or more controlling air signal input tubes generally normal to the axis of the input and collector tubes and terminating in open ends relatively near such axis, and a chamber vent opening near the collector tube. Such relays function with quite low pressure air delivery to the supply and control inputs. For example, with determined spacing of the supply input and collector tubes, air delivered to the supply input tube at say a pressure of the order of 12 to 14 inches of water gauge, will establish (absent air supply to any air signal input tube) a laminar stream or flow of air into the chamber to and into the collector tube. Air output from the collector tube then will be at a pressure of the order of 3 to 4 inches of water gauge, usable as an output operating signal. Now upon delivery of control air under very low pressure, as of the order of .5 to 3 inches of water gauge, to an air signal input tube, such air in discharge from the latter and impinging on the air stream to the collector tube, will reduce the stream to a turbulent condition in deflection from the collector tube to discharge through the chamber vent. The output operating air signal from the collector tube thus will be cut-off, but will restore immediately upon cessation of control air delivery to the chamber via the air signal input tube (or tubes, if more than one). It will be appreciated that such relay is essentially a "Norgate" device, having two stable conditions, namely, an operating air signal output or no output, wherein response of the device in change from one condition to the other is very rapid.

The foregoing as well as other objects and advantages of the invention will appear from the following description of a presently preferred embodiment thereof as illustrated in the accompanying drawings, wherein:

FIG. 2 is a schematic view of penumatic controls and air conduit connections of the controls, according to the present example of the invention;

FIG. 3 is an enlarged, fragmentary sectional view of the scale dial indicator head, as taken from line 3—3 in FIG. 1;

FIG. 3a illustrates diagrammatically one of the air switch devices and its air supply and delivery conduit arrangement relative to the switch supporting structure;

Figure 1:
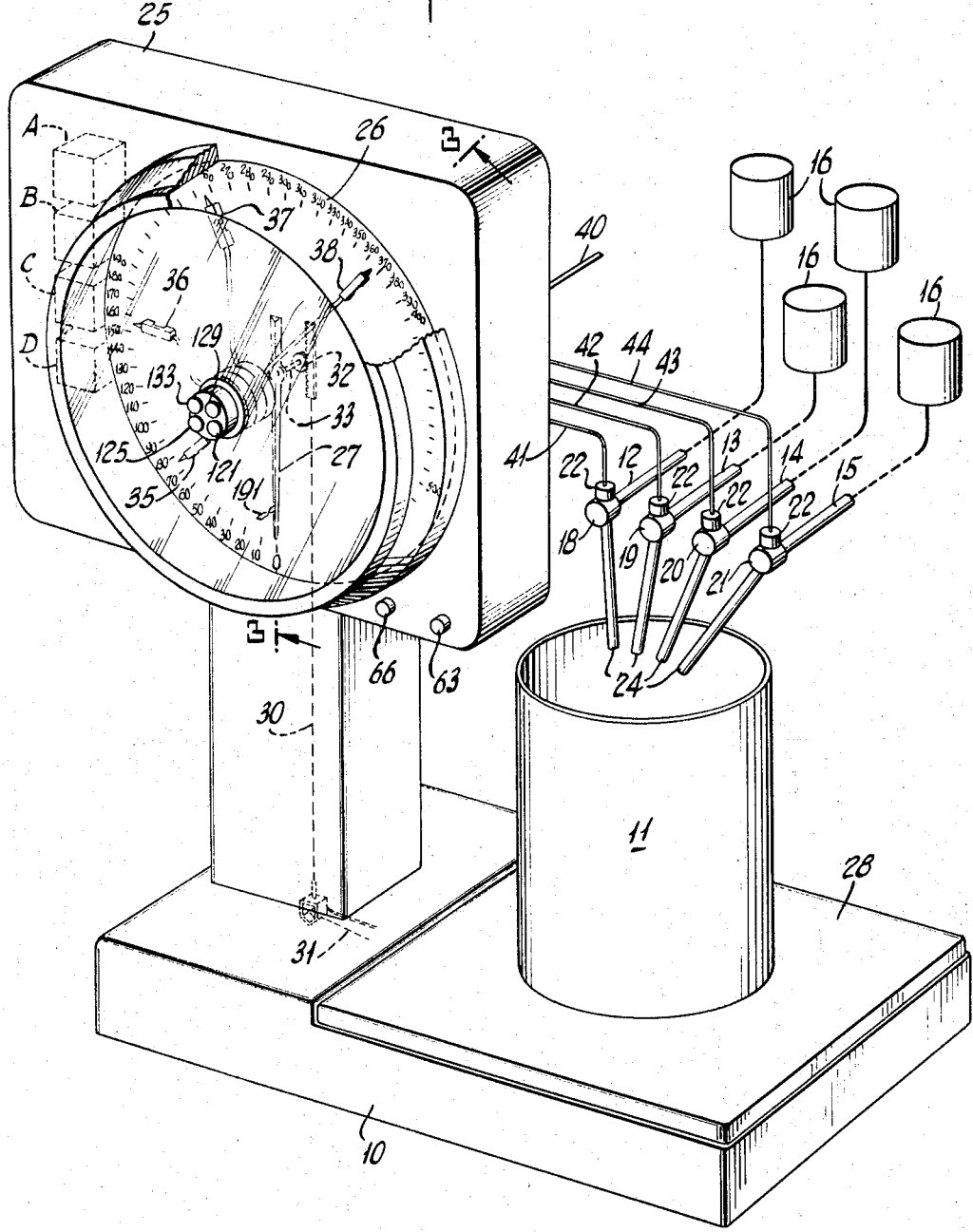
FIG. 1 is a view in perspective of weighing apparatus embodying the present improvement.

FIGS. 4a to 4d are detail views of one of the air switch devices, the views 4b to 4d being sectional views as taken respectively from lines 4b—4b; 4c—4c and 4d—4d in FIG. 4a; and FIG. 5 illustrates in schematic form the air switch and air relay control system according to the present embodiment of the invention.

With reference to the drawings, the present exemplary embodiment of the invention is shown in application to batch weighing apparatus of relatively simple form. As appears in FIG. 1, a suitable platform type weighing scale 10 is provided for load support of a batching container 11. Suitably positioned for material feed to the container are delivery conduits (4 in the present example) 12, 13, 14 and 15 leading from separate supply bins or containers 16 for given materials (liquids, flowable solids, etc.) to be batched. The delivery conduits terminate respectively in control gates 18, 19, 20 and 21 which may be gate valves or other conventional type valves each normally closed and actuatable to an open condition by an air pressure responsive device or motor 22. Each valve has a discharge tube 24 for feed association with the batch container 11.

Scale 10 includes a dial indicator head 25 having weight index dial 26 and pointer or indicator arm or hand 27, the latter being operated from the scale lever system (not shown) supporting scale platform 28, in known manner here indicated diagrammatically in broken lines as comprising a rack rod 30 extending from the lever system output lever 31 to a pinion 32 on the indicator shaft 33. The present improved control arrangement for the feed valve 18 to 21 is contained in the dial head 25. As indicated in FIG. 1 such includes four pneumatic relay units, A, B, C and D (one for each valve 18 to 21) suitably compactly located in the rear portion of the dial head (the locations thereof shown in FIG. 1 being exemplary only), and an equal number of pneumatic weight sensing switch devices 35, 36, 37 and 38 positionable relative to the index dial 26 in a manner presently to be described. These switches are operatively associated with the relay units and with the indicator hand 27 as will hereinafter appear. Air under suitable pressure which may be about 150 p.s.i., is delivered from a source (not shown) to the relay units by supply conduit 40 entering the dial head, while valve operating air pressure under control of the relays is delivered to the motors 22 of feed valves 18 to 21 by the respective conduits 41, 42, 43 and 44 (indicated schematically).

FIG. 2 illustrates schematically the air piping connections of the relay units and sensing switch devices in the dial head. As there indicated, high pressure air supply admitted by conduit 40 is delivered to high pressure air manifold 46, for supply to the relay units A, B, C and D over the respective branches 47, 48, 49 and 50. A branch 52 from supply conduit 40 is connected to the input of a suitable pressure reducer device 53, and the output therefrom over conduit 54 is connected to low pressure manifold 56. Through the pressure reducer 53 the air pressure supply in manifold 56 is preferably of the pressure order of 12 to 14 inches of water gauge, and such aid pressure is supplied to the respective relay units by the manifold branches 57, 58, 59 and 60. An additional branch 62 from manifold 56 supplies air to a manually operated start valve 63 the output of which is connected by line 64 to the first relay unit A, and to a manually operated stop valve 66 having an output line 67 connected to the relay units by branches 68. Start and stop valves 63 and 66 are accessible for manual operation from the front of the dial head 25 as shown in FIG. 1. Completing the schematic of FIG. 2, the sensing switch 35 is connected to relay unit A by air supply and return conduits 70 and 71, sensing switch 36 to relay unit B by supply and return conduits 72 and 73, sensing switch 37 to relay unit C by supply and return conduits 74 and 75, and sensing switch 38 to relay unit D by supply and return conduits 76 and 77. Also, a control air connection is made from relay unit A to unit B over conduit 80; from unit B to unit C over conduit 81, and from unit C to unit D over conduit 82, while air output from the relays A to D are by the respective conduits 41 to 44 which lead to the air motors 22 of the feed valves 18 to 21 (FIG. 1).

Describing now the weight sensing elements or air switches 35 to 38 and referring particularly to FIG. 3, the dial head 25 is provided with a transparent (glass) front plate 100 generally parallel to the index dial 26. Plate 100 is centrally apertured to receive the hub 101 of a mounting member or disc assembly 102, the latter being clamped to the plate by an external member or disc 104 suitably attached to hub 101 as by screws 105. Carried by the external member 104 is a casing 106 which supports a stationary spindle 108 which extends through the hub 101 with its axis coaxial with the that of the shaft 33 of pointer 27. On spindle 108 are four nested sleeve shafts 109, 110, 111 and 112, these being rotatable relative to each other and to the spindle, and with the outermost shaft 112 journalled in hub 101 as a further support for the spindle and shaft assembly. Four gears 114, 115, 116 and 117 in casing 106 are secured respectively to the sleeve shafts 109, 110, 111 and 112, these being provided for shaft turning to locate the air switches as will presently appear. Rotatably carried by casing 106 are equally spaced stub shafts, one thereof (not shown) having a pinion (not shown) engaging gear 114 and having an operating knob 121 (see FIG. 1); another 122 having pinion 124 engaging gear 115 and having an operating knob 125, a third (not shown) having pinion (not shown) engaging gear 116 and having an operating knob 129 (see FIG. 1), while the fourth such stub shaft 130 has a pinion 132 engaging gear 117 and includes an operating knob 133.

As shown the air switches are located in dial head 25 between the front plate 100 and the indicator hand or pointer 27 (the point 27 as shown in FIG. 3 being displaced from its zero position shown in FIG. 1). Switch 35 is mounted on the end of a hollow arm 136 which is carried by a hollow circular member or shroud 137 having its hub 138 fixed on sleeve shaft 112, and similarly switch 36 on arm 140 carried by shroud 141 having its hub (not shown) fixed on sleeve shaft 111; switch 37 on arm 144 carried by shroud 145 having its hub (not shown) fixed on sleeve shaft 110, and switch 38 on arm 148 carried by shroud 149 having its hub (not shown) fixed on sleeve shaft 109. The otherwise open sides of the shrouds are closed by spacer discs 152 which are held against rotation as by suitable pin or arm element 153 common to the discs and mounted on the member 102. The switch supporting arms 136, 140, 144 and 148 which project in the radial direction from the shroud assembly, are directed as shown so that the inner faces or margins 154 (only that of switch 38 being shown in FIG. 3) of all the switches will be in a common plane parallel to the plane of the index dial 26. In addition, the outer terminal ends of the arms are equidistant radially from the axis of spindle 108, so that all of the switches will be correspondingly equidistant from the spindle. As will be appreciated from the view of FIG. 1, the present switch mounting arrangement is such that through manual operation of knob 121 the switch 38 may be disposed opposite any selected point of the index dial 26 but necessarily up-scale from the other switches, while through knob 125 the switch 37 next in order may be located opposite a selected point of the index dial but down-scale from the switch 38. Similarly, through operation of knob 129 the switch 36 may be disposed opposite a selected point of the index dial down-scale from the switch 37, while through knob 133 the switch 35 is positionable at any selected point of the index dial but down-scale from switch 36. To facilitate accurate positionment of the switches opposite desired points of the index dial, each switch is provided with an indexing pointer 156 (as shown on switch 38 in FIG. 3).

In the present example the air switches are identical, so that a detail showing and description of one thereof will suffice for the others as well. Referring to FIGS. 4a to 4d and also to FIGS. 3 and 3a, the air switch 38 comprises a generally rectangular block 160 formed by a base member 161 and a matching cover member 162 of suitable rigid, lightweight material. Matching half-bores in corresponding ends 164 of the members provide a mounting bore 165 to receive the end 166 of support arm 148, corresponding portions 168 of the members on one side of the bore being separated by slots 170 to afford yieldable clamp elements effective through clamp screw 171 for securely clamping the switch block to the arm. Intermediate the ends of the block is a rectangular open recess 172 which is open to the block margin or face 154. The block base member 161 is channeled in its face mating with the cover 162, to provide for reception of an air supply or transmitter nozzle tube 173 having its nozzle end 174 exposed in the block recess 172 and its other end 175 extending through the block bore 165, and for reception of an air receiver nozzle tube 176 which has its nozzle end 178 exposed in the block recess 172 in exact axial alignment with the nozzle end 174 of transmitter tube 173. The block is further channeled in base member 161 for reception of an air output tube 179 relatively closely paralleling a portion of nozzle tube 173 and extending outwardly through block bore 165, and for reception of a conduit 180 which is preferably a flexible plastic tube, connecting receiver nozzle tube 176 to the output tube 179. Clamp elements 182 and 183 of suitable character, are provided to hold the tubes 173, 176 and 179 in proper position wherein in particular, the transmitter and receiver nozzle ends 174 and 178 are relatively spaced apart by a predetermined desired distance in recess 172.

The output tube 179 and end portion 175 of transmitter nozzle tube 173 are received in the end 166 of hollow arm 148, in the switch mounted condition. Connected to these tubes are flexible plastic conduits or tubes extending in the hollow arm. As shown diagrammatically in FIG. 3a, one such conduit 76 connected to transmitter nozzle tube end 175 for supplying low pressure air to the nozzle tube, extends through arm 148 into the hollow shroud 149 wherein it is coiled loosely about the shroud hub at least through approximately one and a half turns, such as to afford sufficient conduit slack to accommodate angular movements of the switch assembly over its positional range. The conduit 76 is continued from its slack coil outwardly through the shroud associated spacer disc 152 (FIG. 3) and thence to and through a junction conduit housing 184 in depending support on the mounting disc 102. The other conduit 77 connected to output tube 179 for conveying output air from the switch receiver nozzle tube 176, extends in like manner through arm 148 to a slack-coil portion in the shroud and thence outwardly through the spacer disc to and through the junction housing 184. From housing 184 the conduits 76 and 77 are led through a flexible cable 186 into the rear area of the dial head 25, for connection to the relay unit D.

In the same manner as now described for the switch 38, the respective air supply and output conduits 70 and 71 (FIG. 2) of switch 35 extend through arm 136 into slack-coiled condition in shroud 137 and thence outwardly through the associated spacer disc 152 to and through housing 184 and cable 186 to relay unit A. Likewise, the respective air supply and output conduits 72 and 73 (FIG. 2) of switch 36 extend through arm 140 into slack-coiled condition in shroud 141 and thence outwardly through the associated spacer disc 152 to and through housing 184 and cable 186 to relay unit B, while the respective supply and output conduits 74 and 75 (FIG. 2) of switch 37 extend through arm 144 into slack-coiled condition in shroud 145 and thence outwardly through the associated spacer disc 152 to and through housing 184 and cable 186 to relay unit C. The operative connections of these conduits to the relay units will appear hereinafter in the description of the control system as shown by FIG. 5.

It is noted at this point in the description of the switches 35 to 38 that air under pressure delivery to the transmitter nozzle tube 173 of each switch will be discharged therefrom in the form of an air stream across the open gap in recess 172, and unless such stream is intercepted, it will enter the receiver nozzle tube 176 of the switch to establish an air signal flow through the output conduit of the switch for performing a control function in the associated relay unit. In accordance with the present invention objectives, the switches are provided to function on low pressure air supply, as for example air supply to the transmitter nozzle at a low pressure of the order of 12 to 14 inches of water gauge. With a determined spacing of the transmitter and receiver nozzles (a typical spacing of about one-half inch in the presently illustrated embodiment), the jet air stream from the transmitter nozzle will enter the receiver nozzle and establish flow through the output conduit at a considerably lower pressure, as in the range of .5 to 3 inches of water gauge. Such low pressure air signal output from the switches is entirely sufficient for control of turbulence amplifier air relays as herein employed in the relay units A to D, to be described in connection with the system shown in FIG. 5. Also, utilizing switch supply and output air flows at the very low pressures indicated, not only enables the employment of very small bore (as of the order of one-sixteenth inch) air conduits and nozzles which permit space and weight saving, but contributes materially to a desirable low rate of air consumption in the system.

As shown in FIG. 3 the switch 38 in mounted condition has the open side of its nozzle recess 172 facing the index dial 26, and is spaced outwardly from the plane of angular displacement of the indicator hand 27. Carried by the hand 27 in outward projection therefrom is an interceptor element 190. The element is located on the hand such that as the hand approaches or attains the position of the switch 38, the outer blade portion 191 of the interceptor will be entered substantially centrally between the switch nozzle ends 174 and 178 and thereby intercept the nozzle air stream. Such interception will of course result in cutting-off air stream reception by the receiver nozzle 178, so that there is then no air signal flow in the output conduit connection of the switch. The interceptor 190 performs the same function in respect to the other switches 35 to 37 as the hand 27 attains the position of each.

Shown schematically in FIG. 5 is the sensing switch and relay control system according to the present illustrative embodiment. Air from a suitable source which may be at about 150 p.s.i., is delivered to high pressure line 46, and to a pressure reducing valve device 53 for delivery to low pressure line 56. A suitable flow restriction or resistor device 192 may be included in line 56 near the output from the reducer 53, and on the output side of the latter the air pressure in the line is preferably of the order of 12 to 14 inches water gauge. Relay unit A provides four pneumatic relay or turbulence amplifier elements here designated TA1, TA2, TA3 and TA4, of which TA1 is a control relay associated with weight sensing switch 35 as will appear presently. These elements are of known character and construction as hereinbefore described in a stated object of the invention. Leading from low pressure air line 56 is a supply manifold 57 connected by branches 194 to the input tubes 196 of the relay elements. Element TA3 has its collector tube 197 connected by line 198 to control signal input tube 200 of element TA4; by line 201 to control signal input tube 202 of element TA2, and by line 204 to control signal input tube 205 of element TA1. The collector tube 206 of element TA1 is connected by line 208 to control signal input tube 209 of element TA2; while collector tube 210 of element TA2 is connected by line 212 to control signal input tube 213 of element TA3, and collector tube 214 of element TA4 is connected by line 216 to a diaphragm actuator or motor 217 operatively associated with a high pressure air delivery valve 218. Air input valve 218 is over branch 47 from supply line 46, and its output is over line 41 to the motor 22 of gate valve 18 (FIG. 1). Switch 35 associated with relay unit A has its air supply line 70 connected to manifold 57, and its signal output line 71 connected to control signal input tube 221 of element TA1.

Provided only for relay unit A is the manually operated start valve 63 in air supply connection to line 56 over line 62, and having its output connected by line 64 to control signal input tube 222 of element TA3. Common to all of the relay units A to D is manually operable stop valve 66 under air supply from line 62 over branch 224, and its air delivery over header 67 from which a branch 68 extends to each relay unit for connection to the control signal input tube 225 of the unit element TA2. Moreover, each turbulence amplifier element TA1 and TA4 has its housing vented to atmosphere, as by the vent 226.

Relay unit B is essentially a duplicate of the unit A, corresponding parts for convenience being denoted by the same reference characters appearing in unit A. Associated with this unit is the weight sensing switch 36 receiving air over line 72 from supply manifold 58 (the latter also supplying the input tube 196 of the elements TA1 to TA4), and delivery air over line 73 to control signal input tube 221 of element TA1. Air valve 218 is supplied with high pressure air from line 46 over branch 48, and its output to line 42 which leads to motor device 22 of the material feed gate valve 19 (FIG. 1). Otherwise the only difference resides in the connection of control signal input tube 222 of element TA3, by way of line 80, to the collector tube 206 of element TA1 in relay unit A, this for a purpose to appear.

Likewise the relay units C and D are essentially duplicates of unit B. Unit C is associated with sensing switch 37, the latter supplied with air over line 74 and delivering air over line 75 to control signal input tube 221 of element TA1, while high pressure air from line 46 goes to valve 218 over line 49, with valve output by line 43 to the motor 22 of gate valve 20 (FIG. 1). Also, branch connection 82 from the collector tube 206 of element TA1 leads to the control signal input tube 222 of element TA3 in relay unit D. Unit D is associated with sensing switch 38 over lines 76 and 77, the latter connected to the control signal input tube 221 of element TA1. Its valve 218 supplied by line 50 from line 46, is connected by output line 44 to the motor 22 of gate valve 21.

Turning now to the operation of the described control system, upon placement of the container 11 on the scale platform 28 the empty weight thereof is tared off (by known tare mechanism not here shown) so that the dial indicator hand 27 is at the no-load or zero mark of the index dial. Assume for example that it is desired to effect container filling with 75 pounds of a first material, 80 pounds of a second material, 100 pounds of a third material and 110 pounds of a fourth material. Given these material weights, the weight sensing switches 35 to 38 are positioned by manual operation of the knobs 121, 125, 129 and 133 (FIGS. 1 and 3), such that the switch 35 is opposite the 75 pound graduation on the index dial; the switch 36 opposite the 155-pound graduation (80 pounds upscale from switch 35); the switch 37 opposite the 255-pound graduation (100 pounds upscale from switch 37), and the switch 38 opposite the 365-pound graduation (110 pounds upscale from switch 37). Also in the present example, the motor operated material feed gate valves 18 to 21 are normally closed in the absence of operating air pressure to the motors 22, and the valves 218 of the relay units A to D are likewise normally closed in the absence of operating air to the valve diaphragm motors 217.

Under the above stated initial conditions and upon air supply over line 40 at about 150 p.s.i., such pressure will be present in system line 46, while through the pressure reducer 53 low pressure air at about 12 to 14 inches of water gauge will be present in system line 56 and in the supply manifold 57 to 60 of the relay units A to D. Considering first the relay unit A, with low pressure air in manifold 57 and passing by branches 194 to the input tubes 196 of the relay elements TA1 to TA4, the initial tendency is to establish an air stream into the respective collector tubes 206, 210, 197 and 214 of the relay elements. However, since the output from collector tube 197 of element TA3 is divided over three lines 198, 201 and 204, as distinguished from the single line output from the collector tubes of elements TA2 and TA4 and the double output from the collector tube of element TA1, there will be less resistance to output air flow from the collector tube 197 of element TA3. Therefore, an air stream into the collector will occur first in element TA3, and such air will pass over line 198 to the control signal input tube 200 of element TA4; over line 201 to the control signal input tube 202 of element TA2, and over line 204 to the control signal input tube 205 of element TA1. Thus the signal air output from control tube 200 in element TA4 will deflect air input from tube 196 away from the collector tube 214 and to discharge through the vent 226, thereby preventing air flow in line 216 to diaphragm motor 217 so that valve 218 then remains closed. Similarly, the signal air outputs from the control tubes 202 in element TA2 and 205 in element TA1 will deflect air from the respective input tubes 196 to vent, preventing output from the respective collector tubes 210 and 206. It is to be noted also that an air stream is then present at sensing switch 35, delivering signal air to the control input tube 221 of relay element TA1, while the start and stop valves 63 and 66 are then closed.

The foregoing represents the initial condition of relay unit A, in which air flow to the collector tube appears only in relay element TA3, the valve 218 is closed, and an air stream is present in switch 35. Exactly the same initial condition obtains in each of the other relay units B to D, the valves 218 thereof being closed and air streams appearing in the respectively associated switches 36 to 38.

Now, upon manual opening of the start valve 63 low pressure air is delivered over line 64 to the control signal input tube 222 of element TA3 in relay unit A, which immediately deflects the air stream from the collector tube 197 to vent 226. The result of collector tube output cut-off at element TA3 is three-fold. Control air is cut-off at control tube 200 of element TA4, thus establishing air flow into its collector tube 214 for delivery to the diaphragm motor 217 and consequent opening of the high pressure air valve 218 to deliver air over line 41 to the motor 22 of gate valve 18. Gate valve 18 then opened, allows feed of the first material into the container 11. At the same time, air flow to control tube 205 of element TA1 ceases, but without establishing air flow into its collector tube 206 since control air appears at the control tube 221 from switch 35. Also at this time, with cut-off of air at the control tube 202 of relay element TA2 and absent control air at its control tubes 209 and 225, air flow occurs to its collector tube 210 for delivery to the control tube 213 of element TA3, thereby preventing re-establishment of air flow into collector tube 197 when the start valve is released to closed position. Thus the start valve may be opened only momentarily to cut-off output from element TA3, whereupon the control air at its control tube 213 serves as a hold expedient after release of the start valve, to retain the element TA3 in its non-output condition. The foregoing represents the second or material feed condition of the relay unit A.

With gate valve 18 then open, material feeds into container 11 and as such occurs the dial hand 27 moves upscale from the zero position, toward switch 35. When the hand reaches the position of switch 35 (set at 75 pounds on the index dial), the hand-carried interceptor blade 191 will intercept the switch air stream and thus cut-off air flow to the control tube 221 of the control relay element TA1 in relay unit A. The immediate result is establishment of an air stream to the collector tube 206 of element TA1, for flow to the control tube 209 of element TA2 thereby cutting-out flow from its collector tube 210 to the control tube 213 of element TA3. As a consequence, collector tube flow will re-establish in element TA3, which will return the relay unit A to its initial condition wherein valve 218 is closed with resulting closure of gate valve 18. There is then 75 pounds of the first material in container 11.

Simultaneously, with return of relay unit A to its initial condition, part of the air output from collector tube 206 of element TA1 in relay unit A passes over line 80 to the control tube 222 of element TA3 in relay unit B, to cut-off collector tube output from the latter. As a result the relay unit B assumes a second condition corresponding to that described for the relay unit A, wherein its valve 218 is open to cause opening of gate valve 19 for delivery of the second material to the container 11. Thus where the second condition of relay unit A is attained under manual control through start valve 63, the second or material feed condition of relay unit B is effected automatically through control relay element TA1 in relay unit A, upon air stream interception at switch 35 when the desired weight of the first material is attained in the container 11.

With delivery of the second material to the container, the dial hand 27 moves upscale to the switch 36 and intercepts its air stream, resulting through control relay element TA1 of relay unit B in return of the latter unit to its first condition (gate valve 19 then closed), and simultaneously in activating relay unit C by way of air line 81, to its second condition causing opening of gate valve 20 for container delivery of the third material. There will then be 80 pounds of the second material in container 11. When the dial hand reaches switch 37 and intercepts its air stream, the relay unit C is returned to its first condition, closing gate valve 20 (with 100 pounds of the third material in the container), and effects over air line 82 activation of relay unit D to its second condition wherein gate valve 21 is open to deliver the desired fourth material to the container.

When the dial hand 27 reaches the position of switch 38 (at 110 pounds of the fourth material in container 11), its blade 191 intercepts the switch air stream and thereby through control relay element TA1 of relay unit D, causes return of the relay to its initial condition closing gate valve 21. This being the end of the sequence of material feed control, all of the relay units will be then in the initial conditions as described, ready for subsequent material delivery control according to the same or different desired settings of the switches 35 to 38.

It is to be noted that in the described initial condition of the relay units A to D, air is in supply to the control tube 205 of the element TA1 in each unit, which thereby prevents air stream flow to the collector tube 206. Upon removal of the filled container 11 from the scale platform, and resulting downscale return of the dial hand 27 toward its zero position, the latter necessarily passes its interceptor through the air stream of switches 37, 36 and 35 in that order. The momentary cut-off or interception of these air streams however, has no affect on the associated control relay elements TA1 since they are held in de-activated conditions by the air from control tubes 205 of the elements.

Regarding the manual stop valve 66, this provides a control expedient common to all of the relay units A to D for enabling stoppage of the container filling operation at any stage thereof, where such stoppage may be desired or necessary for any reason. As shown in FIG. 5, leading from the stop valve air output line 67 are branches 68 each connected to a control tube 225 of the element TA2 in each relay unit. Thus upon opening the stop valve air will be supplied to the control tubes 225 of elements TA2 in all relay units. However, since only one of the relay units then will be in its second or material feed condition wherein air flow to collector tube 210 of its element TA2 is present, the air delivery to control tube 225 of element TA2 in that unit will be effective to cause return of such unit to its first or material feed shut-off condition.

Having now described and illustrated an exemplary embodiment of the invention, it is desired to emphasize that the present improvements afford a highly responsive, quick acting control system which is particularly suitable for material batching and the like. The turbulence amplifier elements of the relay units advantageously permit the use of very low pressure operating and control air in the signal control portion of the system including the dial settable weight sensing air switches, resulting in a desirable low rate of air consumption yet without adversely affecting the very rapid response characteristic of these parts in operation. Importantly moreover, since the improved control arrangement hereof is entirely an air operated system, it is explosion-proof. It will be appreciated also, that while the presently illustrated embodiment concerns the control system as adapted for handling four materials as in a batching operation, a lesser or greater number of air relay units and associated dial settable air switches may be employed as desired.

It is to be understood that the invention embodiment herein shown and described is illustrative only, and that modifications may be made thereto without departing from the scope of the invention hereinafter claimed.

I claim:

1. Means for use in combination with a weighing scale dial unit having an index dial, a transparent front plate spaced from the index dial and an indicating hand between the index dial and front plate movable relative to the index dial, provided for causing operation of pneumatic relay means when said hand reaches a predetermined position relative to said index dial, comprising
    (a) support means on said front plate in axial alignment with the axis of said hand,
    (b) an arm rotatable on said support means and extending radially between said front plate and index dial,
    (c) a pair of axially aligned and spaced apart nozzles carried by said arm,
    (d) means for supplying low pressure air to one of said nozzles for normally maintaining an air stream therefrom into the other nozzle,
    (e) and an interceptor element on said hand positioned thereon for entrance between said nozzles to intercept said air stream when the hand approaches the nozzles.

2. Means for use in combination with a weighing scale dial unit having an index dial, a transparent front plate spaced from the index dial and an indicating hand between the index dial and front plate movable relative to the index dial, provided for causing operation of pneumatic relay means when said hand reaches a predetermined position relative to said index dial, comprising
    (a) support means on said front plate in axial alignment with the axis of said hand,
    (b) an arm rotatable on said support means and extending radially between said front plate and index dial,
    (c) a pair of axially aligned and spaced apart nozzles carried by said arm,
    (d) means operable from the exterior of said front plate for rotating said arm to locate said pair of nozzles opposite a pre-selected point of said index dial,
    (e) means including a first flexible tube extending along said arm for supplying low pressure air to one of said nozzles to normally maintain an air stream therefrom into the other nozzle,
    (f) pneumatic relay means including a control relay,
    (g) a second flexible tube connected to said control relay and extended along said arm to said other nozzle for low pressure air delivery from the latter to the control relay,
    (h) and an interceptor element on said hand positioned thereon for entrance between said nozzles to intercept said air stream when the hand approaches the nozzles.

3. Means as in claim 2 wherein the said first and second flexible tubes each includes a portion thereof coiled about the said support means.

4. In weighing apparatus for container filling to a pre-selected filling material weight, having a load receiver for the container and including a weight indicator dial unit having an index dial and an indicating hand operated from the load receiver, the combination therewith of
    (a) means including a control gate for delivery of material to said container,
    (b) a pair of axially aligned and spaced apart nozzles,
    (c) means supporting said nozzles in said dial unit adjacent said index dial and selectively positionable for locating the nozzles opposite a pre-selected point of said index dial,
    (d) means supplying low pressure air to one of said nozzles for normally maintaining an air stream therefrom into the other nozzle,
    (e) pneumatic relay means including a pneumatic control relay in connection to said other nozzle to receive low pressure air therefrom,
    (f) means supplying operating air pressure to said relay means,
    (g) the relay means in response to operating air pressure supply assuming an initial control condition,
    (h) a gate actuator responsive to said initial control condition of the relay means for closing said control gate,
    (i) means operable to cause said relay means to assume a second control condition,
    (j) said gate actuator in response to said second control condition of the relay means, opening said control gate to deliver material to said container,
    (k) and an interceptor element on said hand positioned thereon for entrance between said nozzles to intercept said air stream when the hand approaches the nozzles,
    (l) said control relay in response to interception of said air stream effecting return of the relay means to said initial control condition whereby to cause said gate actuator to close said control gate.

5. In weighing apparatus for container filling to a pre-selected filling material weight, having a load receiver for the container and including a weight indicator dial unit having an index dial and an indicating hand operated from the load receiver, the combination therewith of
- (a) means including a control gate for delivery of material to said container,
- (b) a pair of axially aligned and spaced apart nozzles,
- (c) means supporting said nozzles in said dial unit adjacent said index dial and selectively positionable for locating the nozzles opposite a pre-selected point of said index dial,
- (d) means supplying low pressure air to one of said nozzles for normally maintaining an air stream therefrom into the other nozzle,
- (e) pneumatic relay means,
- (f) a control relay connected to said relay means and having a control air input opening in connection to said other nozzle to receive low pressure air therefrom,
- (g) means supplying operating air pressure to said relay means and said control relay,
- (h) the relay means in response to operating air pressure supply assuming an initial control condition,
- (i) a gate actuator responsive to said initial control condition of the relay means for closing said control gate,
- (j) means operable dependently upon low pressure air delivery from said other nozzle to the control air input opening of said control relay, to cause said relay means to assume a second control condition,
- (k) said gate actuator in response to said second condition of the relay means, opening said control gate to deliver material to said container,
- (l) and an interceptor element on said hand positioned thereon for entrance between said nozzles to intercept said air stream when the hand approaches the nozzles,
- (m) said control relay in response to interception of said air stream effecting return of the relay means to said initial control condition whereby to cause said gate actuator to close said control gate.

6. In weighing apparatus for batch container filling with at least two materials each to a preselected filling material weight, having a load receiver for the container and including a weight indicator dial unit having an index dial and an indicating hand operated from the load receiver, the combination therewith of
- (a) material delivery means including a first control gate for delivery of one material to the container and a second control gate for delivery of another material to the container,
- (b) a first pair and a second pair of axially aligned and spaced apart transmitter and receiver nozzzles,
- (c) means supporting said pairs of nozzles in said dial unit adjacent said index dial, operable selectively to locate said first pair of nozzles opposite a pre-selected point of the index dial and to locate said second pair of nozzles opposite a different pre-selected point of the index dial,
- (d) means supplying low pressure air to the transmitter nozzle of each pair for normally maintaining an air stream therefrom into the receiver nozzle of the associated pair,
- (e) first pneumatic relay means including a first control relay in connection to the receiver nozzle or said first nozzle pair for receiving low pressure air therefrom,
- (f) second pneumatic relay means including a second control relay in connection to the receiver nozzle of said second nozzle pair for receiving low pressure air therefrom,
- (g) means supplying operating air pressure to the first and second relay means,
- (h) said first and second relay means in response to operating air pressure supply each assuming a corresponding initial control condition,
- (i) a first gate actuator responsive to the initial control condition of the first relay means for closing said first control gate,
- (j) a second gate actuator responsive to the initial control condition of the second relay means for closing said second control gate,
- (k) means operable to cause said first relay means to assume a second control condition,
- (l) said first gate actuator in response to the second control condition of the first relay means, opening said first control gate to deliver said one material to said container,
- (m) an interceptor element on said hand positioned thereon for entrance between the nozzles of each pair to intercept the air stream of the first nozzle pair when the hand approaches the same and to intercept the air stream of the second nozzle pair when the hand approaches the latter pair,
- (n) said first control relay in response to interception by the interceptor element of the air stream of said first nozzle pair, effecting return of said first relay means to its initial control condition thereby causing said first gate actuator to close said first control gate,
- (o) means rendered effective by said first control relay in response thereof to air stream interception at said first nozzle pair, to cause said second relay means to assume a second control condition,
- (p) said second gate actuator in response to the second control condition of the second relay means, opening said second control gate for delivery of said another material to the container,
- (q) and said second control relay in response to interception by the interceptor element of the air stream at said second nozzle pair, effecting return of the second relay means to its said initial condition, thereby causing said second gate actuator to close the second control gate.

7. In weighing apparatus for batch container filling with different materials each to a pre-selected material weight, having a load receiver for the container and including a weight indicator dial unit having an index dial and an indicating hand operated from the load receiver, the combination therewith of
- (a) material supply means including a delivery control gate for each material to be delivered to the batch container,
- (b) pneumatic gate operating relay means for each control gate, effective in a first operating condition to establish the control gate in closed position, and in a second operating condition to establish the control gate in open material delivery position,
- (c) a pneumatic control relay for each relay means,
- (d) a pneumatic switch for each control relay, each switch comprising aligned spaced apart transmitter and receiver nozzles,
- (e) means supporting said switches in said dial unit adjacent the index dial and selectively operable to locate the switches opposite different pre-selected points of the index dial,
- (f) means supplying low pressure air to the transmitter nozzle of each switch for normally maintaining an air stream therefrom into the associated receiver nozzle,
- (g) an air delivery connection from the receiver nozzle of each switch to an associated one of the control relays,
- (h) an interceptor element on said indicating hand positioned thereon for entrance between the nozzles of each switch to intercept the air stream therebetween when the hand approaches the switch,
- (i) means operable to cause a first one of said relay means to assume its said second operating condition, thereby opening its associated control gate to deliver a first material to said container, (j) a first control connection from the control relay of said first relay means to a second one of the relay means, (k) a second control connection from the control relay of said second relay means to a third one of the relay means, (l) a third control connection from the control relay of said third means to a fourth one of the relay means;

(m) the control relay of said first one of the relay means in response to interception by the interceptor element of the air stream in the switch associated with such control relay, effecting return of the first relay means to its first operating condition, thereby closing its associated control gate, and causing through said first control connection said second one of the relay means to assume its said second operating condition, thereby to open its associated control gate for delivery of a second material to the container, (n) the control relay of said second relay means in response to interception by the interceptor element of the air stream in the switch associated therewith effecting return of the second relay means to its first operating condition, thereby closing its associated control gate, and causing through said second control connection said third relay means to assume its second operating condition, thereby to open its associated control gate for delivery of a third material to the container, (o) the control relay of said third relay means in response to interception by the interceptor element of the air stream in the switch associated therewith effecting return of the third relay means to its first operating condition, thereby closing its associated control gate, and causing through said third control connection said fourth relay means to assume its second operating condition, thereby to open its associated control gate for delivery of a fourth material to the container, (p) and the control relay of said fourth relay means in response to interception by the interceptor element of the air stream in the switch associated therewith effecting return of the fourth relay means to its first operating condition, thereby closing its associated control gate.

8. In weighing apparatus according to claim 7, further characterized by stop means common to all of the said gate operating relay means and operable at will to cause return of any said relay means then in its said second operating condition, to its said first operating condition.

9. In weighing apparatus for batch container filling with different materials each to a pre-selected material weight, having a load receiver for the container and including a weight indicator dial unit having an index dial and an indicating hand operated from the load receiver, the combination therewith of (a) material supply means including a delivery control gate for each material to be delivered to the batch container, (b) a plurality of pneumatic switches each comprising aligned spaced apart transmitter and receiver nozzles, (c) means supporting said switches in said dial unit adjacent the index dial and selectively operable to locate the switches opposite different pre-selected points of the index dial, (d) means supplying low pressure air to the transmitter nozzle of each switch for normally maintaining an air stream therefrom into the associated receiver nozzle, (e) an interceptor element on said indicating hand positioned thereon for entrance between the nozzles of each switch to intercept the air stream therebetween when the hand approaches the switch, (f) control means operatively connected to the control gates and normally establishing closure of the gates, (g) start means effective through a portion of the control means for opening a first one of said control gates, (h) and pneumatic control relays connected to the receiver nozzles of said switches and to said control means, (i) said control relays being effective following opening of said first control gate and through interception of the air streams of said switches in succession by the interceptor element, to cause said control means to close said first gate and to open then close the remaining control gates in succession.

10. In weighing apparatus according to claim 9, further characterized by stop means connected to the said control means and operable at will to cause the control means to close any then open one of the said control gates.

References Cited
UNITED STATES PATENTS

| | | | |
|---|---|---|---|
| 2,625,300 | 1/1953 | Saxe | 177—70 |
| 2,650,790 | 9/1953 | Carliss | 177—70 |
| 2,982,368 | 5/1961 | McMahon | 177—70 |
| 3,002,575 | 10/1961 | Appel | 177—70 |
| 3,101,801 | 8/1963 | Miller | 177—70 |

FOREIGN PATENTS 849,314 9/1960 Great Britain.

RICHARD B. WILKINSON, *Primary Examiner.*

GEORGE H. MILLER, JR., *Assistant Examiner.*